United States Patent [19]

Kroker et al.

[11] 4,128,521

[45] Dec. 5, 1978

[54] BAKING FINISHES OF LOW SOLVENT CONTENT

[75] Inventors: Ruprecht Kroker, Bobenheim, Roxheim; Hans Sander, Ludwigshafen, both of Fed. Rep. of Germany

[73] Assignee: BASF Aktiengesellschaft, Ludwigshafen, Fed. Rep. of Germany

[21] Appl. No.: 820,715

[22] Filed: Aug. 1, 1977

[30] Foreign Application Priority Data

Aug. 5, 1976 [DE] Fed. Rep. of Germany ....... 2635117

[51] Int. Cl.$^2$ .......................... C09D 3/58; C09D 3/81
[52] U.S. Cl. .................... 260/31.4 R; 260/31.4 EP; 260/33.2 EP; 260/33.4 EP
[58] Field of Search ................... 260/31.4 R, 33.2 EP, 260/33.4 EP, 31.4 EP

[56] References Cited

U.S. PATENT DOCUMENTS

| | | |
|---|---|---|
| 3,196,120 | 7/1965 | McLaughlin et al. ............ 260/837 R |
| 3,301,801 | 1/1967 | Gaske et al. ............................ 260/17 |
| 3,405,093 | 10/1968 | Walker ........................ 260/33.4 EP |
| 3,919,150 | 11/1975 | Kiel et al. ..................... 260/33.2 EP |
| 3,966,667 | 6/1976 | Sullivan et al. .............. 260/33.4 EP |
| 4,051,195 | 9/1977 | McWhorter ......................... 260/836 |

FOREIGN PATENT DOCUMENTS

| | | | |
|---|---|---|---|
| 1250867 | 12/1960 | France ............................. 260/33.4 EP |
| 1315679 | 12/1962 | France ............................. 260/33.4 EP |
| 1352572 | 1/1964 | France ............................. 260/33.4 EP |
| 943217 | 12/1963 | United Kingdom ............. 260/33.4 EP |

*Primary Examiner*—Ronald W. Griffin
*Attorney, Agent, or Firm*—Keil, Thompson & Shurtleff

[57] ABSTRACT

The invention relates to baking finishes of low solvent content, consisting essentially of an acrylate resin, an epoxy resin and a mixture of organic solvents, with or without pigment, catalyst and other conventional auxiliaries, in which the acrylate resin is a copolymer which contains from 10 to 35% by weight of $\alpha,\beta$-olefinically unsaturated carboxylic acids as copolymerized units, has a very low K value and has an acid number of from 70 to 250 mg of KOH/g, the epoxy resin contains at least 2 oxirane groups per molecule and the mixture of organic solvents is a mixture of from 20 to 80% by weight of a solvent having a boiling point of from 100° to 280° C and a dielectric constant of from 2 to 4.99, and from 80 to 20% by weight of a solvent having a boiling point of from 80° to 200° C and a dielectric constant of from 5 to 27. The weight ratio of acrylate resin to epoxy resin is from 9:1 to 6:4.

These baking finishes of low solvent content may be used, e.g., as finished for domestic equipment and as automotive primers.

7 Claims, No Drawings

BAKING FINISHES OF LOW SOLVENT CONTENT

The present invention relates to baking finishes of low solvent content, which essentially comprise an acrylate resin, an epoxy resin and solvents, with or without pigment, catalyst and other conventional auxiliaries.

Baking finishes which contain mixtures of an acidic acrylate resin and an epoxy resin as the binder, together with pigment and solvent and with or without catalyst, were disclosed long ago and are described, for example, in U.S. Pat. No. 3,301,801, British Pat. No. 943,217, U.S. Pat. No. 3,196,120, French Pat. No. 1,250,867, French Pat. No. 1,315,679 and French Pat. No. 1,352,572.

Such baking finishes give coatings having good mechanical properties and good resistance to chemicals. They are therefore used for, for example, finishes on appliances.

A disadvantage of baking finishes based on such compositions is, however, that they can only be processed if they contain a relatively high proportion of volatile organic solvents, and hence they cause substantial pollution of the environment.

It is an object of the present invention to provide baking finishes which contain an acrylate resin, an epoxy resin and solvents, with or without pigment and catalyst, which can be processed, e.g. sprayed, with substantially smaller proportions of organic solvent without thereby adversely influencing other processing characteristics or resulting in a poorer level of properties of the baked coatings than those of the corresponding prior art.

We have found that this object is achieved by providing baking finishes of low solvent content, which essentially comprise
(A) an acrylate resin,
(B) an epoxy resin and
(C) a mixture of organic solvents,
with or without pigment, catalyst and other conventional auxiliaries, in which the acrylate resin (A) is a copolymer which contains from 10 to 35% by weight of $\alpha,\beta$-olefinically unsaturated carboxylic acids as copolymerized units, has a K value (measured by the Fikentscher method) of less than 15 and has an acid number of from 70 to 250 mg of KOH/g, the epoxy resin (B) contains at least 2 oxirane groups per molecule, and the mixture of organic solvents (C) is a mixture of from 20 to 80% by weight of a solvent having a boiling point of from 100° to 280° C. and a dielectric constant of from 2 to 4.99 and from 80 to 20% by weight of a solvent having a boiling point of from 80° to 200° C. and a dielectric constant of from 5 to 27, the weight ratio of the components (A):(B) being from 9:1 to 6:4 and the weight ratio of the components (A+B):(C) being from 7:3 to 5:5.

Particularly preferred baking finishes of the above type are those in which the acrylate resin (A) is a copolymer of from 12 to 25% by weight of acrylic acid or methacrylic acid, from 5 to 70% by weight of one or more esters of acrylic acid or methacrylic acid with a monoalkanol of 1 to 8 carbon atoms, from 5 to 40% by weight of styrene and from 0 to 20% by weight of an alkanediol monoester of acrylic acid or methacrylic acid.

Surprisingly, the baking finishes of the invention can be processed with very low solvent contents. They can be sprayed at solids contents of more than 70% by weight, preferably of from 75 to 80% by weight, can be used on vertical surfaces, exhibit good levelling and, after baking, give coatings which have good mechanical properties and good resistance to chemicals and solvents and provide good corrosion protection.

The following is to be noted in respect of the individual components on which the baking finishes of the invention are based.

(A) The acrylate resin (A) comprises from 10 to 35% by weight of $\alpha,\beta$-olefinically unsaturated carboxylic acids as copolymerized units, has a K value, measured by the method of Fikentscher (cf. Cellulosechemie 13 (1932), 58) of less than 15 and has an acid number of from 70 to 250 mg of KOH/g. Suitable $\alpha,\beta$-olefinically unsaturated carboxylic acids are dicarboxylic acids, eg. maleic acid, fumaric acid and itaconic acid, and, preferably, monocarboxylic acids, eg. acrylic acid and/or methacrylic acid, which are preferably present, as copolymerized units, in amounts of from 12 to 25% by weight.

The following comonomers can be present as copolymerized units in the copolymer (A):

(a) Esters of acrylic acid and/or methacrylic acid with linear or branched monoalkanols of 1 to 8 carbon atoms, eg. ethyl acrylate, n-, iso- and tert.-butyl acrylate, 2-ethylhexyl acrylate, methyl methacrylate, ethyl methacrylate and butyl methacrylate, preferably in amounts of from 5 to 70% by weight based on the copolymer (A), (b) Vinyl-aromatics, eg. styrene and/or vinyltoluene, preferably in amounts of from 5 to 40% by weight, based on copolymer (A), (c) Optionally, up to 20% by weight of acrylic acid monoesters and/or methacrylic acid monoesters of alkanediols of 2 to 6 carbon atoms, which alkanediols may also contain one or more oxa groups, e.g. hydroxypropyl acrylate, butanediol monoacrylate, hydroxyethyl methacrylate, diethylene glycol monoacrylate and monomethacrylate and triethylene glycol monoacrylate and monomethacrylate, and (d) Optionally, minor amounts, of up to 10% by weight, of further copolymerizable monomers, eg. acrylonitrile, methacrylonitrile, acrylamide, methacrylamide, methylolacrylamide, methylolmethacrylamide, N-alkoxymethylacrylamide, N-alkoxymethylmethacrylamide, vinyl esters, eg. vinyl acetate and vinyl propionate, dialkylmaleates and dialkylfumarates, monoalkylmaleates and monoalkylfumarates, acrolein and allyl alcohol.

Examples of particularly preferred acrylate resins (A) are copolymers of from 12 to 25% by weight of acrylic acid or methacrylic acid, from 10 to 40% by weight of ethyl acrylate, n-butyl acrylate or 2-ethylhexyl acrylate, from 0 to 30% by weight of t-butyl acrylate and from 10 to 40% by weight of styrene.

The acrylate resins (A) to be employed according to the invention are preferably manufactured as solution polymers in fairly high-boiling solvents, having boiling ranges of from 100° to 280° C. and dielectric constants of from 2 to 5. The polymerization is advantageously carried out at the reflux temperature of the solvent, without a regulator.

The acrylate resins to be employed according to the invention can also be manufactured as solution polymers in solvents having boiling points of from 80° to 200° C. and dielectric constants of from 5 to 27. In some cases it is also advantageous to use mixtures of solvents from the stated groups of solvents.

However, the manufacture of the acrylate resin (A) by polymerization can also be carried out in other conventional solvents for finishes, in the presence or absence of regulators.

The acrylate resins (A) to be used according to the invention can also be manufactured by bulk polymerization and be dissolved subsequently.

The acrylate resins to be used according to the invention, with K values of less than 15, have viscosities, measured on 60% strength solutions in ® Solvesso 100 (an aromatic hydrocarbon of boiling range from 155° to 168° C., containing more than 95% of aromatics)/n-butanol of from 10 to 30 poise, preferably from 15 to 25 poise, at 23° C. This corresponds to efflux times (beaker with a 6 mm orifice, at 23° C.) of from 70 to 200 seconds, preferably from 90 to 150 seconds.

(B) Suitable epoxy resins with at least 2 oxirane groups per molecule are especially those having epoxide values of from about 0.2 to 0.7 mole of epoxide/100 g of material. Examples of suitable components (B) are reaction products of epichlorohydrin and bisphenol A, epichlorohydrin and polyalcohols, eg. trimethylolpropane or pentaerythritol, or epichlorohydrin and aliphatic, cycloaliphatic or aromatic polycarboxylic acids. However, low molecular weight acrylate resins with oxirane side groups, e.g. glycidyl methacrylate homopolymers and copolymers, may also be used as epoxy resins (B).

The ratio of acrylate resin (A) to epoxy resin (B) may be varied within wide limits, but preferably the carboxyl/epoxide ratio is from 0.3:1 to 3:1.

(C) Component C is a mixture of from 20 to 80% by weight of a solvent having a boiling point of from 100° to 280° C. and a dielectric constant of from 2 to 4.99, and from 80 to 20% by weight of a solvent having a boiling point of from 80° to 200° C. and a dielectric constant of from 5 to 27.

The following are suitable solvents having a boiling point of from 100° to 280° C. and a dielectric constant of from 2 to 4.99:

Solvesso 100 (an aromatic hydrocarbon from Esso, containing more than 95% of aromatics), Solvesso 150 (an aromatic hydrocarbon from Esso, containing more than 95% of aromatics), ® Shellsol R (an aromatic hydrocarbon from Shell, containing more than 80% of aromatics), toluene and xylene, as well as mixtures of these solvents.

Examples of suitable solvents having a boiling point of from 80° to 200° C. and a dielectric constant of from 5 to 27 are n-propanol, i-propanol, n-butanol, i-butanol, pentanol, amyl alcohol, 2,2-dimethylpropanol, hexanol, 2-ethylhexanol, cyclohexanol, ethylene glycol monomethyl ether (methylglycol), ethylene glycol monoethyl ether (ethylglycol), ethylene glycol monobutyl ether (butylglycol), diethylene glycol monomethyl ether (methyldiglycol), diethylene glycol monoethyl ether (ethyldiglycol), diethylene glycol monobutyl ether (butyldiglycol), propylene glycol monomethyl ether, ethylene glycol monoacetate, propylene glycol monoacetate, ethylene glycol monoethyl ether acetate, ethylene glycol monomethyl ether acetate, butyl acetate, diacetone-alcohol, 2-ethylmercaptoethanol, methyl isobutyl ketone and mixtures of these solvents.

Solvent mixtures of from 30 to 70% by weight of aromatic hydrocarbons, having a boiling range of from 150° to 270° C. and containing more than 80% by weight of aromatics, and from 70 to 30% by weight of alcohols which may or may not contain glycol monoalkyl ethers and/or glycol monoalkyl ether acetates are preferred.

Suitable pigments are the inorganic and organic pigments conventionally used in the surface coatings industry, e.g. titanium dioxide, inorganic and organic colored pigments, carbon black, talc, Aerosil and rust-protection pigments.

Preferably, the solvents already described are used to dilute the pigmented finishes to a spraying viscosity. However, it is also possible to use other conventional solvents for finishes, eg. aromatics, alcohols, esters and ketones.

The baking finishes, of low solvent content, of the invention can also, if desired, be crosslinked using conventional catalysts. Examples of suitable catalysts are tertiary amines, e.g. 1,2-dimethylimidazole and 1-phenylimidazole, or quaternary ammonium salts, e.g. tetrabutylammonium iodide.

In addition, auxiliaries conventionally used in the surface coatings industry, eg. levelling agents, anti-crater agents, dispersants, e.g. silicone oils, and, for example, finely divided silica to act as a thixotropic agent, may be added to the baking finishes of low solvent content.

The baking finishes of the invention may be used, for example, for the manufacture of finishes for domestic equipment, and of automotive primers.

It is a particular advantage that the finishes can be applied, in layers from 40 to 50 μm thick, to vertical surfaces, even in the absence of thixotropic agents, without sagging.

The parts and percentages in the text which follows, and in the Example, are by weight.

MANUFACTURE OF ACRYLATE RESIN I 376 parts of aromatic hydrocarbon having a boiling range of from 155 to 178° C. and containing more than 95% of aromatics (for example ® Solvesso 100 from Esso) and 94 parts of ethylglycol acetate are introduced into a round flask and heated to the reflux temperature (~155° C.). A mixture of 300 parts of 2-ethylhexyl acrylate, 300 parts of styrene, 200 parts of t-butyl acrylate, 200 parts of methacrylic acid and 27 parts of t-butyl perbenzoate is added, under $N_2$, in the course of 2 hours. 30 minutes after completion of the addition, a further 13 parts of t-butyl perbenzoate are added and the polymerization is continued for 1 hour at the reflux temperature. Solids content = 70.0%, K value (according to Fikentscher) = 13.5 (measured on a 3% strength solution in acetone).

The resin solution is diluted to 60% solids content with n-butanol.

| | |
|---|---|
| Viscosity/23° C | 17.2 poise |
| Efflux time (beaker with 6 mm orifice/ 23° C) | 120 sec. |

If the acrylate resin I is diluted with n-butanol to, respectively, 50 or 40% solids content, the following viscosities are obtained.

| Solids content | 50% by weight | 40% by weight |
|---|---|---|
| Viscosity/23° C | 2.71 poise | 1.25 poise |
| Efflux time (beaker with 6 mm | 62 sec. | 21 sec. |

| -continued | | |
|---|---|---|
| Solids content | 50% by weight | 40% by weight |
| orifice/23° C) | | |

MANUFACTURE OF THE ACRYLATE RESIN II 175 parts of an aromatic hydrocarbon having a boiling range of from 155° to 178° C. and containing more than 95% of aromatics (for example ® Solvesso 100), are introduced into a round flask and heated to the reflux temperature (~160° C.) under $N_2$. A mixture of 210 parts of 2-ethylhexyl acrylate, 210 parts of styrene, 140 parts of t-butyl acrylate, 140 parts of methacrylic acid and 19 parts of t-butyl perbenzoate is then added in the course of 2 hours. 30 minutes after completion of the addition, a further 9 parts of t-butyl perbenzoate are added and the polymerization is continued for 1 hour.

Solids content = 81.0%, K value (according to Fikentscher) = 13.2 (measured on a 3% strength solution in acetone).

The acrylate resin II is diluted with an aromatic hydrocarbon (boiling point 155° to 178° C., containing more than 95% of aromatics, for example Solvesso 100), n-butanol or mixtures of this aromatic hydrocarbon (=HC) and n-butanol, to a solids content of 65%. The following viscosities are found:

| Solvent to give 65% solids content | Viscosity |
|---|---|
| 100 parts of aromatic HC | more than 800 p |
| 62 parts of aromatic HC<br>38 parts of n-butanol | 104 p |
| 50 parts of aromatic HC<br>50 parts of n-butanol | 72 p |
| 38 parts of aromatic HC<br>62 parts of n-butanol | 53 p |

If the acrylate resin II is diluted with an aromatic hydrocarbon (boiling range 155°–178° C., for example Solvesso 100) to a solids content of 50%, the viscosity is 220 poise.

An acrylate resin III manufactured similarly to acrylate resin II gives a solids content of 82.0% and a K value (according to Fikentscher) of 14.8.

The acrylate resin III is diluted to 65% solids content with various polar solvents. The following viscosities are found:

| Diluent | Viscosity |
|---|---|
| n-Butanol | 127 poise |
| Ethylglycol | 121 poise |
| i-Butanol | 208 poise |
| Butylglycol | 288 poise |
| Butyldiglycol | 500 poise |
| Ethylglycol acetate | 796 poise |

EXAMPLE 124.0 parts of acrylate resin I (solids content = 60%), 26.4 parts of an epoxy resin based on bisphenol A (epichlorohydrin, epoxide value = 0.54), 140.0 parts of $TiO_2$, 2.0 parts of tetrabutyl-ammonium iodide (a 10% strength solution in a 1:1 mixture of n-butanol and xylene), 6.0 parts of n-butanol and 6.0 parts of xylene are thoroughly dispersed for 30 minutes in a vibratory mill, for example a Red Devil.

The mixture is then diluted to spraying viscosity (60 seconds, measured according to DIN 53,211) with about 15 parts of a 1:1 solvent mixture of butylglycol and xylene.

Solids content = 74.0%.

The finish is sprayed onto sheet steel and is baked for 30 minutes at from 140° to 190° C.

Testing of coating gives the following results:

| Coating thickness | 50 μm |
|---|---|
| Gloss at 60° (DIN 67,530) | 95 |
| Pendulum hardness (DIN 53,157) | 160 sec. |
| Erichsen value (DIN 53,156) | 4.5 mm |
| Resistance to wash liquors | 7 cycles |

The resistance to wash liquors is determined by boiling a coated sheet for 8 hours in a 1% strength solution of a commercial detergent (e.g. OMO) and leaving it to lie in the cold solution overnight. This test is repeated until recognizable changes in the coating, e.g. a deterioration of the gloss, blistering or detachment from the sheet, are observable.

The baking finish of low solvent content can be applied, even without thixotropic agents, in a thickness of from 40 to 50 μm to vertical surfaces without sagging.

We claim:

1. A baking finish of low solvent content consisting essentially of (A) an acrylate resin, (B) an epoxy resin, and (C) a mixture of organic solvents, wherein the acrylate resin (A) is a copolymer containing from 10 to 35% by weight of α,β-olefinically unsaturated carboxylic acid as copolymerized units and having a K value (measured by the Fikentscher method) of less than 15 and an acid number of from 70 to 250 mg of KOH/g; the epoxy resin (B) contains at least 2 oxirane groups per molecule, and the organic solvent mixture (C) is a mixture of from 30 to 70% by weight of an aromatic hydrocarbon mixture having a boiling range of from 150° to 270° C., a dielectric constant of from 2 to 4.99 and containing more than 80% by weight of aromatics with from 70 to 30% by weight of one or more alcohols having a boiling point range of from 80° to 200° C. and a dielectric constant of from 5 to 27, or a mixture of said alcohol or alcohols with at least one compound boiling at from 80° to 200° C. and selected from the group consisting of glycol monoalkyl ether and glycol monoalkyl acetate, the weight of the components (A):(B) being from 9:1 to 6:4 and the weight ratio of the components (A+B):(C) being from 7:3 to 5:5.

2. A baking finish as set forth in claim 1, wherein the acrylate resin (A) is a copolymer of from 12 to 25% by weight of acrylic acid or methacrylic acid, from 5 to 70% by weight of one or more esters of acrylic acid or methacrylic acid with a monoalkanol of 1 to 8 carbon atoms, from 5 to 40% by weight of styrene and from 0 to 20% by weight of an alkanediol monoester of acrylic acid or methacrylic acid.

3. A baking finish as set forth in claim 1 wherein the acrylate resin (A) is a copolymer of from 12 to 25% by weight of acrylic acid or methacrylic acid, from 10 to 40% by weight of at least one compound from the group comprising ethyl acrylate, n-butyl acrylate and 2-ethylhexyl acrylate, from 10 to 40% by weight of styrene and from 0 to 30% by weight of t-butyl acrylate.

4. A baking finish as set forth in claim 1 wherein the solids content is more than 70% by weight.

5. A baking finish as set forth in claim 1 wherein epoxy resin (B) has an epoxide value of from about 0.2 to 0.7 mole of epoxide/100 g of material.

6. A baking finish as set forth in claim 1 wherein the carboxyl/epoxide ratio of the acrylate resin (A) to the epoxy resin (B) is from 0.3:1 to 3:1.

7. A baking finish as set forth in claim 1, wherein said finish contains pigment, catalyst and/or other auxillaries.

* * * * *